US007476850B2

(12) United States Patent
Oonishi et al.

(10) Patent No.: US 7,476,850 B2
(45) Date of Patent: Jan. 13, 2009

(54) METHOD AND ITS APPARATUS FOR MASS SPECTROMETRY

(75) Inventors: Fujio Oonishi, Yokohama (JP); Kenichi Shinbo, Yokohama (JP); Ritsuro Orihashi, Tokyo (JP); Yasushi Terui, Tsuchiura (JP); Tsukasa Shishika, Hitachinaka (JP)

(73) Assignee: Hitachi High-Technologies Corporation, Tokyo (JP)

( * ) Notice: Subject to any disclaimer, the term of this patent is extended or adjusted under 35 U.S.C. 154(b) by 273 days.

(21) Appl. No.: 11/431,656

(22) Filed: May 11, 2006

(65) Prior Publication Data

US 2006/0289739 A1 Dec. 28, 2006

(30) Foreign Application Priority Data

May 12, 2005 (JP) ............................ 2005-139277
Feb. 28, 2006 (JP) ............................ 2006-051867

(51) Int. Cl.
*H01J 49/00* (2006.01)
*G01N 19/10* (2006.01)

(52) U.S. Cl. ....................... 250/287; 250/281; 250/282; 250/288

(58) Field of Classification Search ......... 250/281-300, 250/423 R; 73/23.2, 23.26, 23.27, 23.28
See application file for complete search history.

(56) References Cited

U.S. PATENT DOCUMENTS 7,057,712 B2 * 6/2006 Beck et al. .................... 356/72
7,084,393 B2 * 8/2006 Fuhrer et al. ................ 250/283
7,265,346 B2 * 9/2007 Whitehouse et al. ........ 250/287
2002/0175292 A1 * 11/2002 Whitehouse et al. ........ 250/394
2003/0010907 A1 * 1/2003 Hayek et al. ................ 250/281
2004/0057050 A1 * 3/2004 Beck et al. .................. 356/336
2005/0006577 A1 * 1/2005 Fuhrer et al. ................ 250/287
2006/0192111 A1 * 8/2006 Fuhrer et al. ................ 250/288
2006/0248942 A1 * 11/2006 Oonishi et al. ............. 73/23.27
2006/0289739 A1 * 12/2006 Oonishi et al. .............. 250/287
2008/0073504 A1 * 3/2008 Shinbo et al. ............... 250/287

FOREIGN PATENT DOCUMENTS

JP 2000-299084 10/2000
JP 2005-166627 6/2005
JP 2005-268152 9/2005

* cited by examiner

*Primary Examiner*—Bernard E Souw
(74) *Attorney, Agent, or Firm*—Antonelli, Terry, Stout & Kraus, LLP.

(57) ABSTRACT

The present invention relates to a data processing device for mass spectrometry, in which measurements are performed in a high dynamic range without causing an overrange in an A/D converter in any TOF scan. A data acquisition circuit of a mass spectrometer includes an amplitude value computing circuit which measures and stores a maximum amplitude value of an ion detection signal, a gain control circuit for determining and setting a gain amount for the next measurement, and others. From the immediately preceding TOF scan data or TOF scan data plural times before, the maximum amplitude value of the ion detection signal is extracted. Then, before the next TOF scan, an optimum gain amount is determined based on the extracted maximum amplitude value to adjust the gain of the input signal, and the ion signal is sampled in the A/D converter.

21 Claims, 11 Drawing Sheets

METHOD AND ITS APPARATUS FOR MASS SPECTROMETRY

CROSS-REFERENCE TO RELATED APPLICATION

The present application claims priority from Japanese Patent Application No. JP 2005-139277 filed on May 12, 2005 and Japanese Patent Application No. JP 2006-051867 filed on Feb. 28, 2006, the contents of which are hereby incorporated by reference into this application.

TECHNICAL FIELD OF THE INVENTION

The present invention relates to a mass spectrometry technology. More particularly, it relates to a technology effectively applied to data processing device for mass spectrometry using an A/D converter (analog-digital converter) in a Time-of-Flight Mass Spectrometer (TOF-MS).

BACKGROUND OF THE INVENTION

The TOF-MS includes an interface, a Time-Of-Flight (TOF) region, a gain adjuster, a pulser, a data acquisition circuit, and others. In the TOF-MS, the ionized sample is accelerated and allowed to fly, and a time of flight depending on its mass and an ion intensity (voltage value) are measured, thereby analyzing components contained in the sample.

In an analysis in this TOF-MS, firstly, a sample to be analyzed is ionized in the interface, and is then fed into the TOF region simultaneously with the start of measurement. The ions fed into the TOF region are applied with a voltage at a timing of an ion injection signal, and fly in a predetermined orbit inside the TOF region in a vacuum state.

When ions reach (collide with) a detector in the TOF region, an ion detection signal is outputted from the detector. This ion detection signal is acquired, via the gain adjuster with fixed gain settings, by a data acquisition circuit using an A/D converter, and data of the ion detection signal is outputted to an input/output device via a CPU. The measurement results are displayed as mass spectra, and the components contained in the sample can be analyzed from the intensity (voltage value) of each spectrum and its time (mass).

For example, regarding the TOF-MS, a technology as described in Japanese Patent No. 3701136 (Patent Document 1) has been known, in which gain switching means is provided and the remeasurement for a mass spectrum where an overrange is detected is performed by decreasing the gain, thereby compensating a peak value at which the overrange occurs.

Meanwhile, as a result of studies by the inventors of the present invention for the above-described TOF-MS, the following has been revealed, which is described with reference to FIG. 9 and FIG. 10. FIG. 9 is a drawing that depicts a state of measurement (TOF scan) and an addition process in a mass spectrometer, and FIG. 10 is a drawing of maximum amplitude characteristics of each TOF scan.

For example, in the TOF-MS, the measurement sensitivity (S/N ratio) of spectrum data obtained in one measurement is often insufficient. Therefore, the measurement sensitivity is increased by obtaining a mass spectrum by adding waveform data obtained in plural times of measurement as shown in FIG. 9. In this case, a measurement for obtaining a mass spectrum is referred to as a mass spectrum measurement, and each of the measurements is referred to as a TOF scan. It is assumed herein that the TOF scan is to acquire detector output data of ions accelerated by one ion injection signal, that is, to acquire spectrum data from time t0 (ion injection timing) to time t1 as shown in FIG. 9.

Note that, in FIG. 9, for convenience of description, spectrum data have a peak value at approximately the same time (mass) in any TOF scan. In practice, however, one ion or a plurality of ions are detected at approximately the same time, and therefore the shape of the spectrum (intensity of the peak value and width of the spectrum) is varied in each TOF scan.

A significant feature of the TOF-MS is that a voltage amplitude value of the ion detection signal has a characteristic of being gradually changed based on the number of times of TOF scan (lapse of time). In this case, "gradually" means that the voltage amplitude value is changed by less than twice an amplitude value obtained through the immediately preceding TOF scan, that is, the voltage amplitude value is not abruptly changed.

Changes in a maximum amplitude value of the ion detection signal with respect to the number of times of TOF scan are as shown in FIG. 10. The maximum amplitude value indicates a voltage difference between a maximum peak value and a minimum peak value in spectrum data obtained in one TOF scan (refer to FIG. 9). This maximum amplitude value is proportional to the amount of ions colliding with the detector. That is, the characteristic of FIG. 10 also represents changes in ion concentration during measurement. This characteristic is increased after the start of mass spectrum measurement (ion inflow), and after reaching its peak, it is gradually attenuated. The difference in amplitude between a maximum value and a minimum value is twenty-fold or more in some cases. This is because, although the ion concentration is high immediately after the start of mass spectrum measurement and the number of ions injected through a TOF scan is large, the concentration is gradually lowered by repeating the TOF scan. Also, although there is a slight difference in shape of the characteristic depending on the sample, the degree of vacuum inside the TOF region, etc., the maximum amplitude value is changed gradually or monotonously to some degree as shown in FIG. 10.

Therefore, for example, when a measurement is performed with a full scale (voltage input range) of the A/D converter being matched to the maximum value side of the above-mentioned characteristic, a dynamic range (resolution) of the A/D converter with respect to a signal having a low amplitude value becomes insufficient. Consequently, the measurement accuracy is significantly degraded. Meanwhile, when a measurement is performed with the full scale being matched to the minimum value side, an overrange occurs in the A/D converter with respect to a signal having a large amplitude value, and proper data cannot be obtained. As a result, the measurement accuracy is significantly degraded.

In general, such a problem can be solved by using an A/D converter with an extremely high dynamic range (multi-bit). With such an A/D converter with a high sampling frequency (time resolution), however, the number of bits is increased, which accordingly poses a problem of cost increase.

Also, in the technology disclosed in Patent Document 1, after once obtaining a mass spectrum, an overrange is determined, and then, a measurement is performed again. Therefore, a measurement time is increased.

As described above, in the data acquisition circuit in the mass spectrometer, in order to improve measurement accuracy (S/N ratio) of the ion detection signal, data of TOF scans that have been performed are all acquired, and are then subjected to an addition process. Therefore, a first problem of the conventional technology lies in that signal reproducibility of the added data is significantly degraded when measurement data of a low dynamic range or measurement data where an overrange has occurred are acquired.

Also, a second problem of the conventional technology lies in that, in a method of detecting the occurrence of an overrange signal from the A/D converter and repeating the measurement until the measurement sensitivity reaches a predetermined level, the measurement time until a desired mass spectrum is obtained is increased.

SUMMARY OF THE INVENTION

The present invention relates to a time-of-flight mass spectrometer. According to the present invention, even for an ion signal having a signal level varied with lapse of measurement time, measurements are preformed in a high dynamic range without causing an overrange in an A/D converter in any TOF scan. Consequently, a desired mass spectrum with a high degree of reproducibility of an ion signal can be efficiently obtained in a short time.

The typical ones of the inventions disclosed in this application will be briefly described as follows.

The present invention is directed to a mass spectrometer of an A/D conversion type for measuring and acquiring time-of-flight data. The mass spectrometer at least includes: amplitude value computing means which measures and stores a maximum amplitude value of an ion detection signal for each ion injection; gain control means which determines and sets a gain amount for the next measurement based on an output of the amplitude value computing means; and an A/D converter which samples the ion detection signal whose gain is adjusted by the gain control means, and the mass spectrometer has the following implementation means:

In first implementation means of the present invention, the maximum amplitude value of the ion detection signal (or a predetermined computation value) is extracted from immediately preceding TOF scan data or TOF scan data plural times before. Then, before the next TOF scan is performed, an optimum gain amount is determined based on the maximum amplitude value (or the predetermined computation value), and the gain of the input signal is adjusted. Then, the ion signal is sampled by the A/D converter.

Also, in second implementation means of the present invention, a gain adjustment value for obtaining a mass spectrum is acquired in advance. The adjustment value is changed for each TOF scan so as to set the gain amount before the TOF scan is performed, and then, the ion signal is sampled by the A/D converter.

Furthermore, in third implementation means of the present invention, a new detector for detecting the amount of ions is provided in the TOF region to measure a total amount of ions before TOF scan. Then, based on the amount of ions, an appropriate gain adjustment value is calculated, and the gain amount is set before the TOF scan is performed. Then, the ion signal is sampled by the A/D converter.

The effects obtained by typical aspects of the present invention will be briefly described below.

According to the present invention, in the time-of-flight mass spectrometer, an appropriate gain adjustment is performed for each TOF scan, and then the ion signal is sampled by the A/D converter. Therefore, no overrange occurs in the A/D converter, and a measurement can be performed in a high dynamic range. Consequently, it is also possible to efficiently obtain a desired mass spectrum with a high degree of signal reproducibility of the ion signal.

Also, according to the present invention, in the time-of-flight mass spectrometer, in addition to performing an appropriate gain adjustment for each TOF scan, even when an overrange occurs during measurement, the overrange is detected to control whether data is to be stored or not, which makes it possible to perform the signal addition without degrading sampling accuracy of the ion signal in the A/D converter. Consequently, since a high dynamic range can be achieved, a desired mass spectrum with a high degree of signal reproducibility of the ion signal can be efficiently obtained.

Furthermore, according to the present invention, in the time-of-flight mass spectrometer, an appropriate gain adjustment value is given to the signal amplitude of the ion signal which depends on the concentration or type of a sample to be measured, and an appropriate gain adjustment value can be set from the start of the measurement, based on the result obtained from the signal amplitude of the ion signal in the immediately preceding mass spectrum measurement or a mass spectrum measurement plural times before. Consequently, since a high dynamic range can be achieved from the start of a measurement, a desired mass spectrum with a high degree of signal reproducibility of the ion signal can be efficiently obtained immediately after the start of the measurement.

These and other objects, features and advantages of the invention will be apparent from the following more particular description of preferred embodiments of the invention, as illustrated in the accompanying drawings.

BRIEF DESCRIPTIONS OF THE DRAWINGS

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

Figure 1:
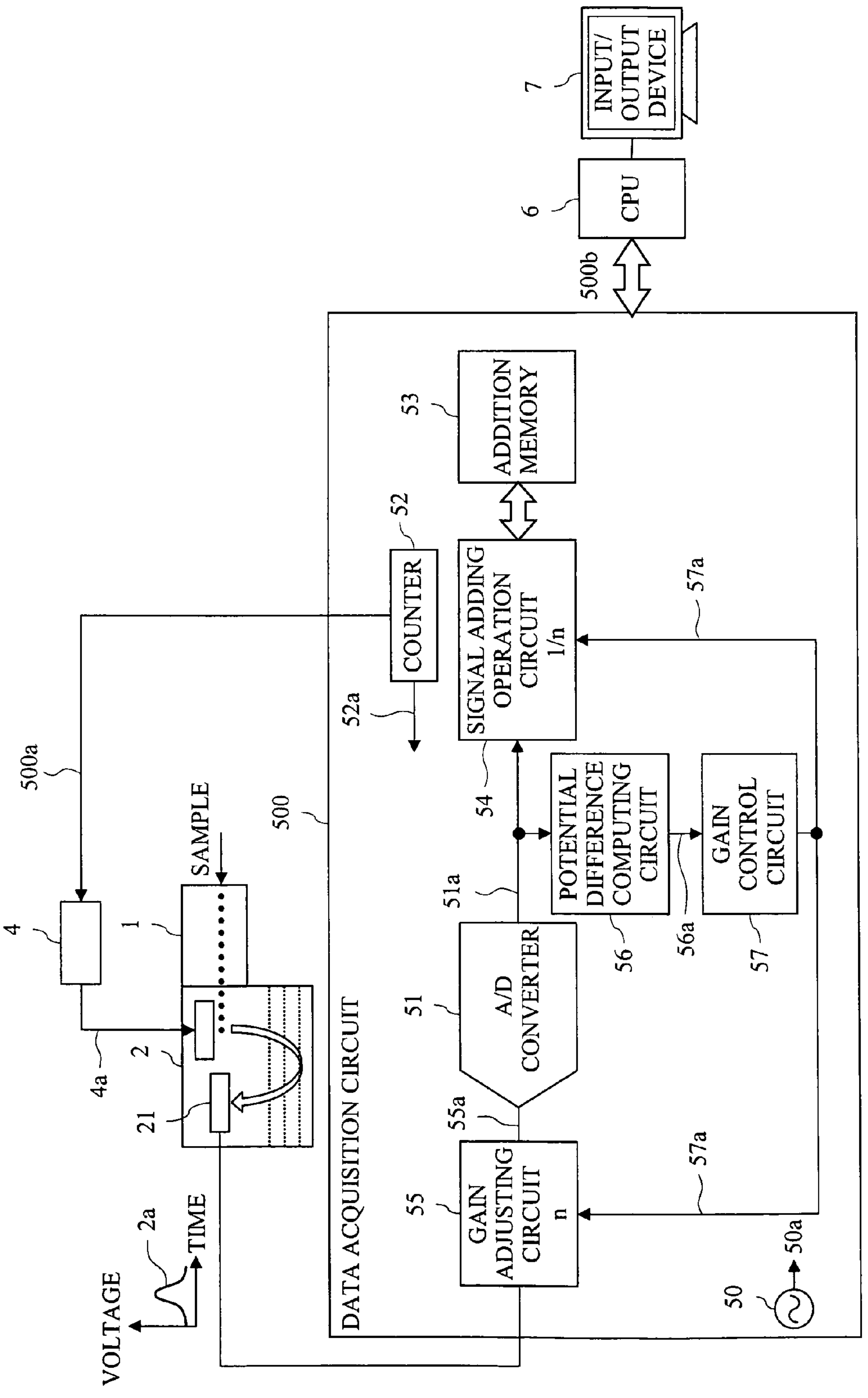
FIG. 1 is a drawing of the configuration of a mass spectrometer according to a first embodiment of the present invention.

An example of the configuration of a mass spectrometer according to a first embodiment of the present invention will be described with reference to FIG. 1. FIG. 1 is a drawing of the configuration of a mass spectrometer using a data processing device of an A/D conversion type for mass spectrometry.

The mass spectrometer according to the first embodiment is a Time-Of-Flight (TOF) mass spectrometer that acquires data through a predetermined method described below.

This mass spectrometer includes: a section provided with an interface 1 for ionizing a sample to be analyzed, a TOF region 2 in which the ionized sample is applied with a voltage and accelerated to allow the ions to fly toward a detector 21, the detector 21 which detects the flying ions, and a pulser 4 for generating an ion injection signal 4*a* which determines the timing of accelerating ions; a data acquisition circuit 500 for measuring and acquiring a voltage value and a time of flight of an ion detection signal 2*a* generated from the detector 21; a CPU 6 for controlling the data acquisition circuit 500 and analyzing the obtained data 500*b*; and an input/output device 7 which displays the measurement result and the analysis result and is used to control the mass spectrometer by a user.

Note that the data acquisition circuit 500 is basically a data processing device for mass spectrometry using an A/D converter, and it includes an A/D converter 51 for digitizing the ion detection signal 2*a* to convert it to TOF scan data 51*a*, a signal adding operation circuit 54 for performing an addition process of the digitized TOF scan data 51*a*, an addition memory 53 for storing added data, a clock generator 50, a counter 52, and other components described later.

The data acquisition circuit 500 further includes a gain adjusting circuit 55 capable of arbitrarily adjusting the level of an inputted ion signal at a former stage of the A/D converter 51, an amplitude value (potential difference) computing circuit 56 for obtaining a maximum amplitude value (maximum potential difference) of the ion signal from the digitized TOF scan data 51*a*, and a gain control circuit 57 for obtaining an optimum gain amount for the next TOF scan based on the maximum amplitude value and determining the gain of the gain adjusting circuit 55.

The clock generator 50 can generate various operating clocks for use in each component circuit in the data acquisition circuit 500. For example, the A/D converter 51 and the counter 52 operate in synchronization with clock signals from this clock generator 50. Also, the counter 52 can generate a counter value 52*a* serving as time information for each component circuit in the data acquisition circuit 500 and a measurement start signal 500*a*.

Next, the operation of the data acquisition circuit 500 when a TOF scan is performed once will be described.

It is assumed herein that gain amount data 57*a* outputted from the gain control circuit 57 has already been set in the gain adjusting circuit 55 and the signal adding operation circuit 54 before a TOF scan is performed. An initial value of the gain amount data 57*a* is assumed to be n (here, $0 \leqq n$). In the next TOF scan, a value obtained by multiplication by n is used in the gain adjusting circuit 55, and a value obtained by multiplication by 1/n is used in the signal adding operation circuit 54.

First, when an instruction for starting a TOF scan is given from the CPU 6 or an external device, the measurement start signal 500*a* is generated in the counter 52 in the data acquisition circuit 500. In the data acquisition circuit 500, a time of generating this signal is taken as a reference time (0 second), and data acquisition is performed within a time range set by the user.

The pulser 4 receiving the measurement start signal 500*a* sends the ion injection signal 4*a* to the TOF region 2, which injects ions at the timing of receiving that signal. When the injected flying ions reach (collide with) the detector 21, the ion detection signal 2*a* is generated from the detector 21.

The ion detection signal 2*a* is inputted to the data acquisition circuit 500, and the gain thereof is adjusted in the gain adjusting circuit 55. Then, it is sampled in the A/D converter 51.

Since the initial value of n times is set in the gain adjusting circuit 55, the inputted ion detection signal 2*a* is multiplied by n and is then inputted to the A/D converter 51.

In the A/D converter 51, the ion detection signal 55*a* multiplied by n is sampled in a certain time cycle to convert it to TOF scan data (digital data) 51*a* indicating a voltage value at each time segment. Since the obtained TOF scan data 51*a* has a value gain-adjusted by n times, this value is converted to the original value (1/n times) in the signal adding operation circuit 54 and then stored in the addition memory 53. If the addition memory 53 has data already stored therein, the contents of the addition memory 53 are once read in the signal adding operation circuit 54. Then, the current TOF scan data 51*a* after conversion is added thereto, which are then stored again in the addition memory 53.

While being stored in the addition memory 53, the TOF scan data 51*a* is also used to determine the gain amount for the next TOF scan. The amplitude value computing circuit 56 detects a maximum peak value indicating a maximum voltage value and a minimum peak value indicating a minimum voltage value from the TOF scan data, and then computes a potential difference (amplitude value) therebetween, thereby obtaining a maximum amplitude value in the TOF scan data. This minimum peak value may be a noise level voltage (a maximum value or an average value) measured in a state where a signal is not inputted to the A/D converter 51 or a value directly set by the user.

Next, the gain control circuit 57 determines a gain amount based on a maximum amplitude value 56*a* obtained from the current TOF scan data 51*a* so that the ion signal level for the next TOF scan is as close to the full scale of the A/D converter 51 as possible and overrange does not occur.

Figure 2:
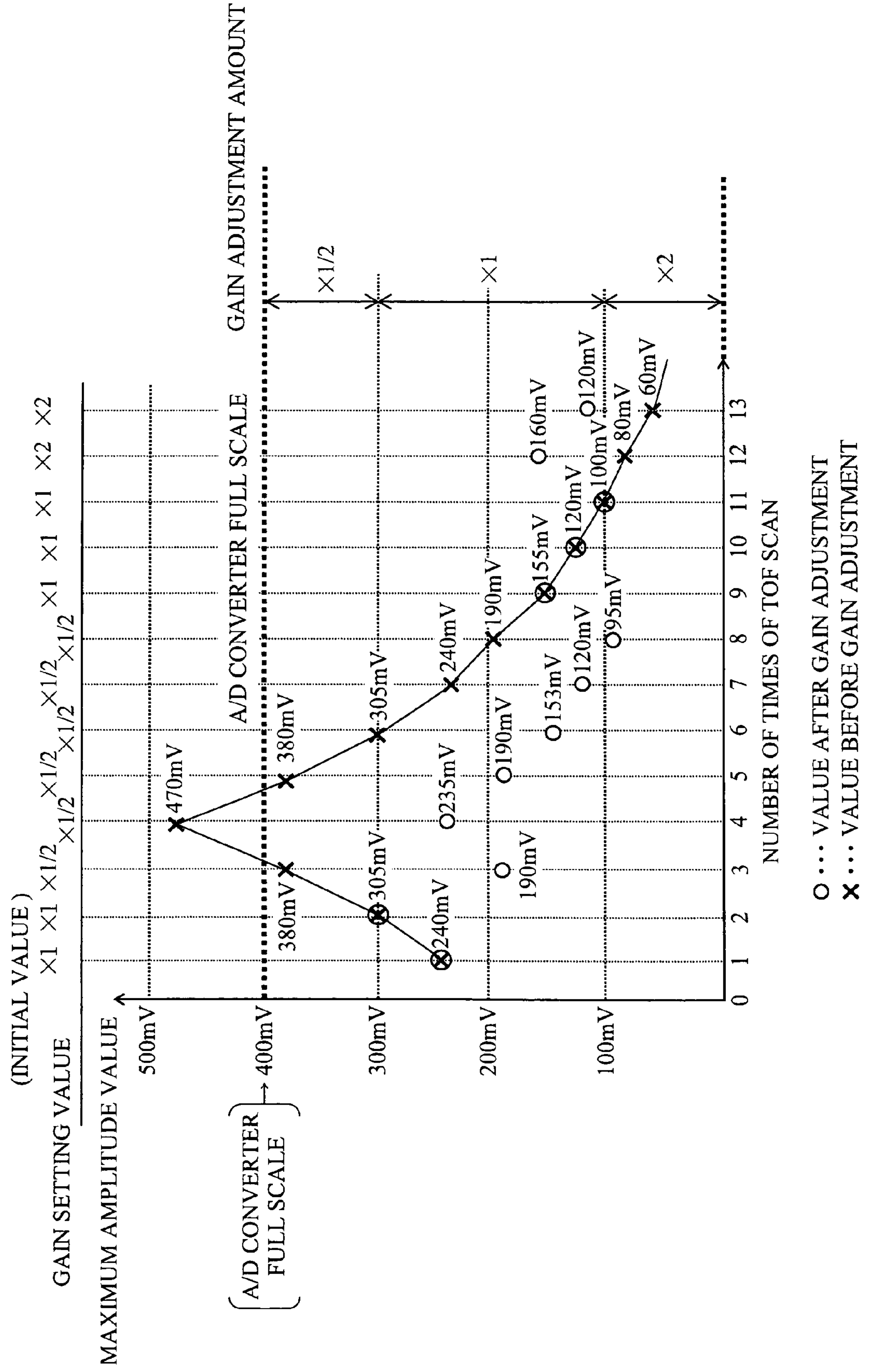
FIG. 2 is a drawing that depicts a maximum amplitude value characteristic of an ion signal and a gain adjustment process according to the first embodiment of the present invention.
Figure 3:
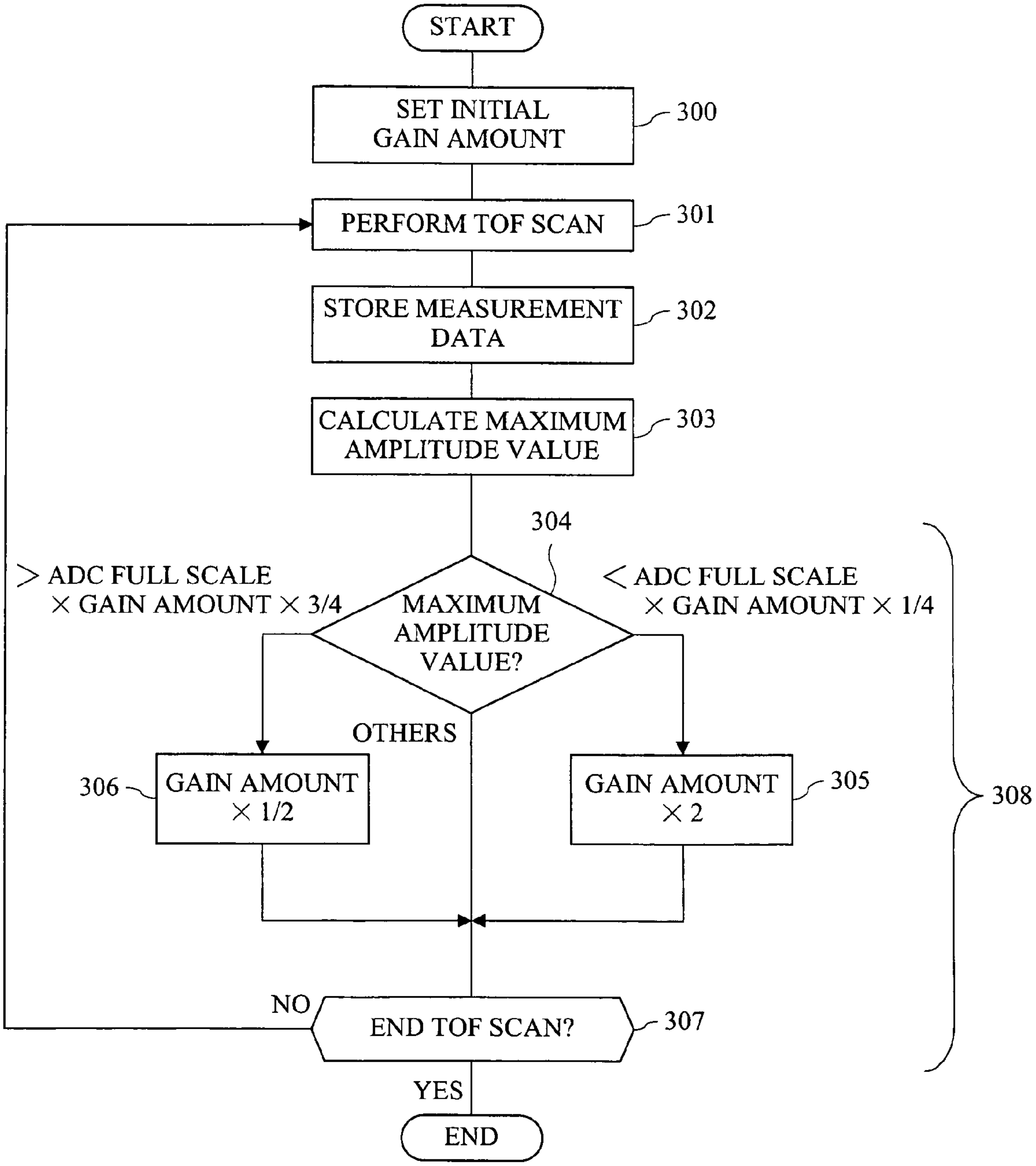
FIG. 3 is a flow diagram of a process at the time of mass spectrum measurement according to the first embodiment of the present invention.

Subsequently, an example of a gain adjustment process in the gain control circuit 57 according to the first embodiment will be described with reference to FIG. 2 and FIG. 3. FIG. 2 depicts a maximum amplitude value characteristic of the ion signal and a gain adjustment process. FIG. 3 depicts a process flow at the time of mass spectrum measurement.

The flowchart of FIG. 3 depicts one mass spectrum process. A process 308 represents a process to be performed by the gain control circuit 57. Also, in the present embodiment, described is an operation in the case where gain adjustment is performed to a signal whose changes in maximum amplitude value between TOF scans are within ±25% (¼) with respect to the immediately preceding value (that is, a signal that does not abruptly change).

Through the process from the start of measurement to the steps 300 to 303 (setting an initial gain amount, performing a TOF scan, storing measurement data, and calculating a maximum amplitude value), a first TOF scan is completed, and a maximum amplitude value is calculated from the TOF scan data.

Next, the gain control circuit 57 determines a level of the maximum amplitude value calculated from the gain-adjusted data with respect to the full scale of the A/D converter 51, thereby determining a gain for the next TOF scan (step 304). In the determination in step 304, as shown in FIG. 2, the full scale of the A/D converter 51 is divided into four, and if the obtained maximum amplitude value is within a range of ¼ or smaller of the full scale, the gain amount (current setting value) is doubled (step 305). Alternatively, if the maximum amplitude value is within a range of ¾ or larger of the full scale, the gain amount (current setting value) is multiplied by ½ (step 306). Otherwise, the gain amount is not changed and the current setting value is left as it is (×1).

Note that, although the immediately preceding TOF scan data is used as the maximum amplitude value to determine the gain amount in this case, a maximum amplitude value calculated from TOF scan data plural times before (for example, an average value or a maximum value) may be used instead. In the initial gain amount setting (step 300), the initial gain amount can be determined from a maximum amplitude value obtained from a previous measurement or the immediately preceding mass spectrum measurement, as long as the initial gain amount can prevent an overrange in the first TOF scan as much as possible and is close to the full scale of the A/D converter.

FIG. 2 shows how to adjust the gain amount when the maximum amplitude value is actually changed. For example, in the case where the A/D converter 51 with its full scale of 400 mV is used, the initial value of the gain setting value is onefold (×1), and the measured maximum amplitude value is 240 mV (first TOF scan), the maximum amplitude value is determined to be within a range of ¼ to ¾ of the full scale, and therefore the gain setting value for the next TOF scan is set as it is, that is, onefold.

Next, in a second TOF scan, the measured maximum amplitude value is 305 mV, which is determined to be within a range of ¾ or larger of the full scale. Therefore, the gain setting value for the next TOF scan is ½-fold (×½) according to step 306 in the flowchart.

Thereafter, the process is repeated in the same manner. In an eighth TOF scan, the maximum amplitude value is 95 mV, which is determined to be within a range of ¼ or smaller of the full scale. Therefore, the gain setting value for the next TOF scan is set to be twofold (×2) according to step 305 in the flowchart.

The gain amount data 57*a* determined in the gain control circuit 57 is sent to the gain adjusting circuit 55 and the signal adding operation circuit 54.

As described above, in the gain adjusting circuit 55, this gain amount data 57*a* (n) is set as a gain amount (xn) for the next TOF scan.

The signal adding operation circuit 54 converts the voltage value of the current TOF scan data 51*a* to the original value (×1/n) according to the gain amount data 57*a* (n) and stores it in the addition memory 53.

If the addition memory 53 has data already stored therein, the contents of the addition memory 53 are once read in the signal adding operation circuit 54. Then, the current TOF scan data 51*a* is added thereto, which are then stored in the addition memory 53 again.

If an overrange occurs in the A/D converter 51, an overrange signal outputted from the A/D converter 51 is detected in the signal adding operation circuit 54 so that addition of the TOF scan data this time is not performed. By doing so, since addition of the data acquired when the overrange occurs is not performed, it is possible to prevent the degradation in accuracy of mass spectrum measurement.

After the TOF scan is completed, a measurement end determination is performed in step 307 based on the number of times of TOF scan. If conditions have not yet been satisfied, the procedure returns to step 301 (performing a TOF scan) to repeat the process. If conditions have been satisfied, the measurement ends.

As described above, the gain control circuit 57 can determine the gain setting value based on the maximum amplitude value calculated from the immediately preceding TOF scan or a TOF scan plural times before, so that an overrange can be prevented from occurring in the next TOF scan and also a measurement can be performed in a dynamic range as high as possible.

In the present embodiment, gain control during one mass spectrum measurement has been mainly described. Similarly, it is easily understood that, also in the gain control at the start of measurement for each mass spectrum measurement, the gain adjustment value can be determined based on the maximum amplitude value calculated during the immediately preceding mass spectrum measurement or a mass spectrum measurement plural times before, so that an overrange can be prevented from occurring at the start of the next mass spectrum measurement and also a measurement can be performed in a dynamic range as high as possible.

As described above, according to the mass spectrometer of the first embodiment, in the data acquisition circuit 500 of an A/D conversion type, the maximum amplitude value of the ion detection signal is detected from the data obtained in the immediately preceding TOF scan or a TOF scan plural times before, and a measurement is performed while adjusting the gain of the input signal level of the next TOF scan based on that maximum amplitude value. Therefore, a measurement can be performed in a dynamic range as high as possible without causing an overrange in any TOF scan.

Second Embodiment

Next, a mass spectrometer and a data processing method thereof according to a second embodiment of the present invention will be described.

A data acquisition circuit according to the second embodiment has a feature in a gain adjusting method. The hardware configuration and measurement data adding method are similar to those of the first embodiment described above.

Figure 4:
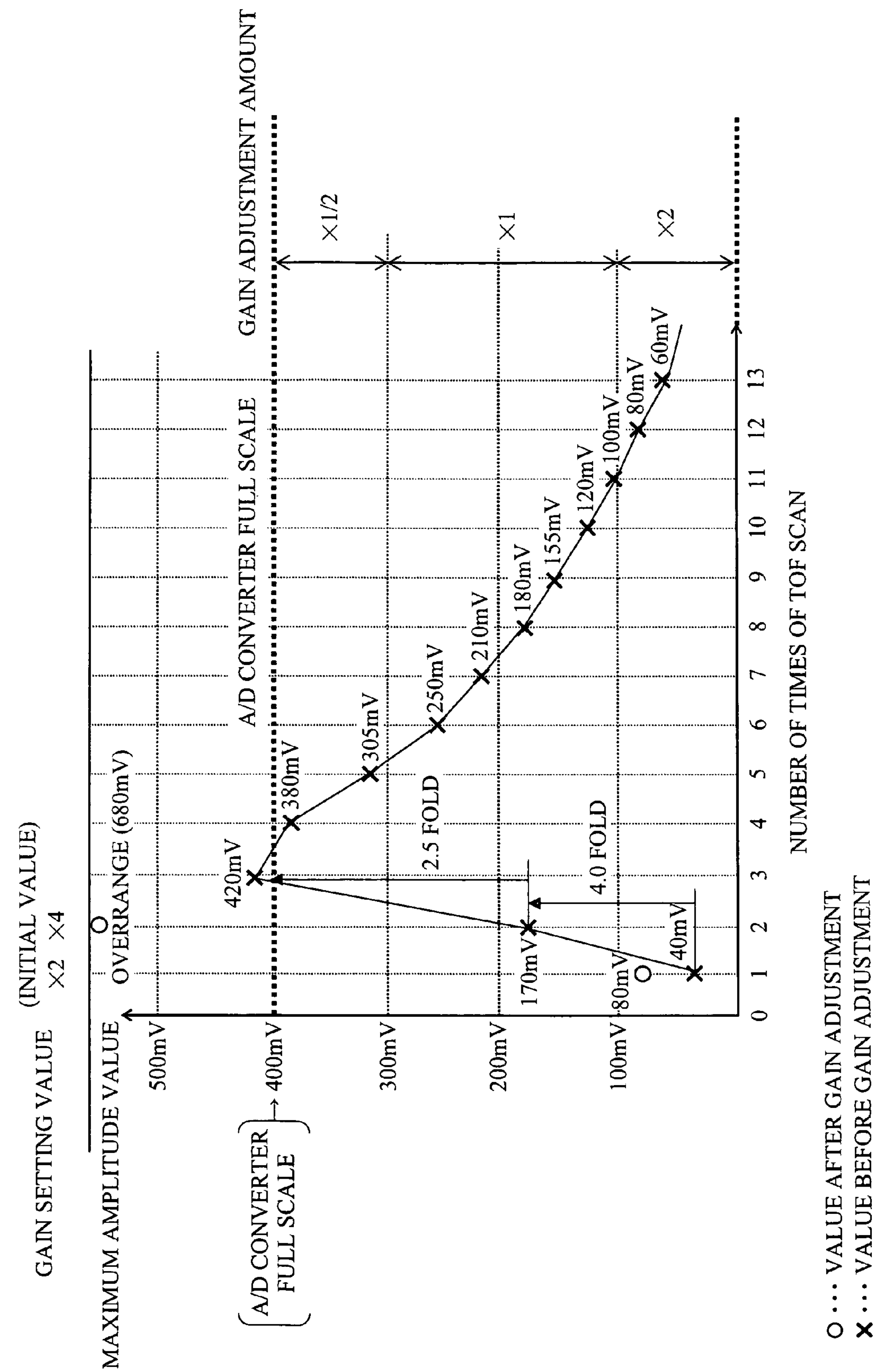
FIG. 4 is a drawing of a maximum amplitude value characteristic of an ion signal according to a second embodiment of the present invention.

An example of a maximum amplitude value characteristic of an ion signal with respect to the number of times of TOF scan will be described with reference to FIG. 4. FIG. 4 depicts the maximum amplitude value characteristic of the ion signal.

In the first embodiment, it is preconditioned that the amount of change in maximum amplitude value between TOF scans is within ±25% (¼) with respect to the immediately preceding value. Depending on the sample or measurement conditions, however, a characteristic with a sudden rising is observed in some cases as shown in FIG. 4.

In the characteristic of FIG. 4, the maximum amplitude value is abruptly increased immediately after the start of mass spectrum measurement (ion inflow). The amount of change in maximum amplitude value between the first and second TOF scans is a fourfold or more, and the amount of change in maximum amplitude value between the second and third TOF scans is twofold or more. However, after the maximum amplitude value reaches its peak, it is attenuated not abruptly but gradually, like that in FIG. 2.

If gain adjustment described in the first embodiment is applied to such a characteristic, in TOF scans in the range where the maximum amplitude value of the signal is abruptly changed, gain control cannot achieve the optimum gain value and an overrange possibly occurs as shown in FIG. 4.

For its prevention, in the second embodiment, a pre-scan is performed before mass spectrum measurement. In the pre-scan, the maximum amplitude value characteristic of the ion signal is measured in advance, and optimum gain amount data matching with the characteristic is then calculated and recorded. In actual mass spectrum measurement, the recorded gain amount data is read from the memory and set in accordance with a TOF scan number. By doing so, it is possible to perform a measurement in a high dynamic range without causing an overrange in any TOF scan.

Figure 5:
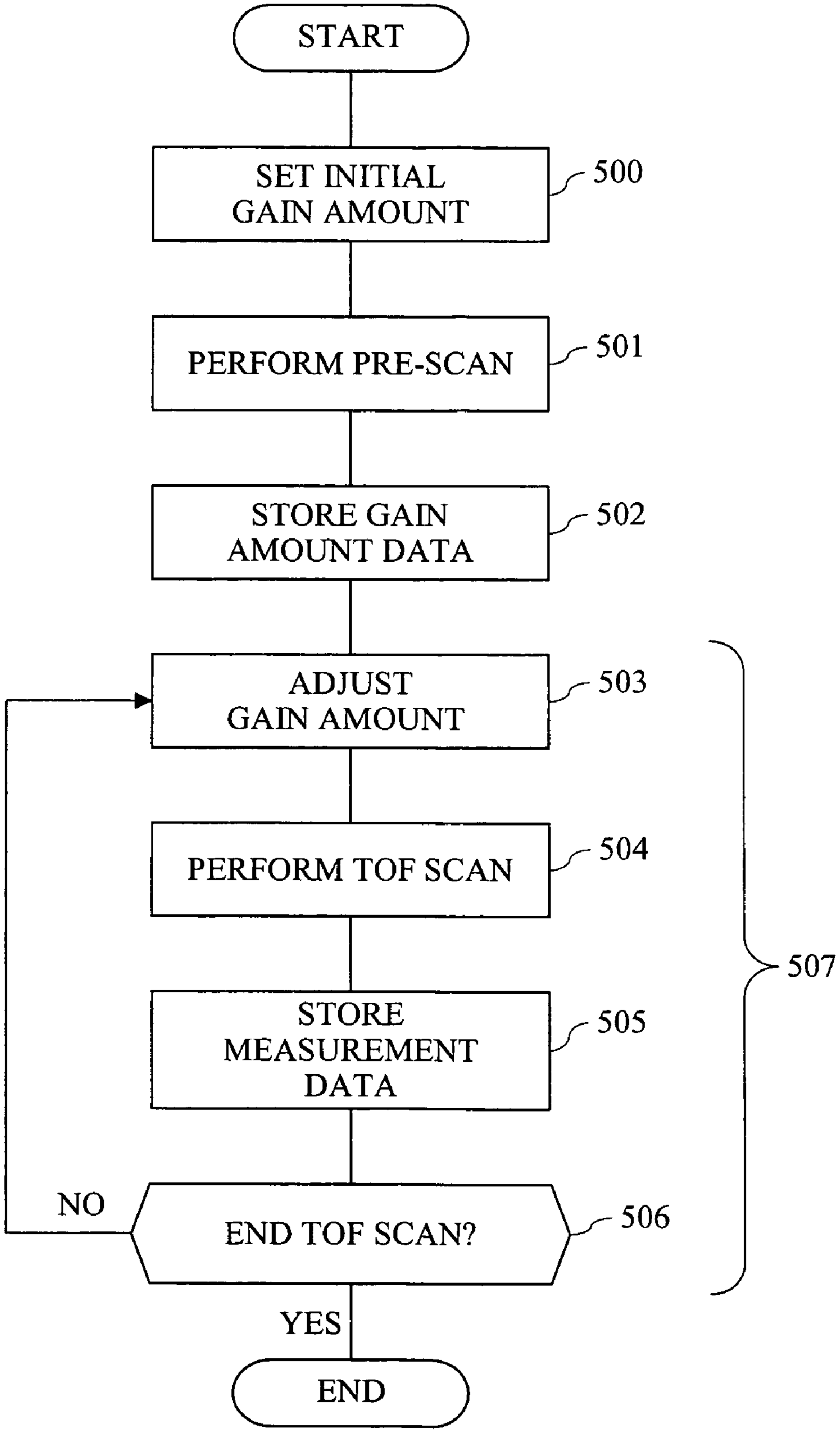
FIG. 5 is a flow diagram of a process at the time of mass spectrum measurement according to the second embodiment of the present invention.

An example of a mass spectrum process according to the second embodiment will be described with reference to FIG. 5. FIG. 5 depicts a process flow at the time of mass spectrum measurement.

First, an initial gain amount at the time of performing a pre-scan is set in step 500. However, since step 500 is performed before a pre-scan and a peak value of the maximum amplitude value characteristic to be measured is not known, a gain amount not causing an overrange even if a large signal enters is set.

Next, a pre-scan is performed (step 501). In the pre-scan, a measurement equivalent to a mass spectrum measurement (the same number of times of TOF scan) is performed to measure a maximum amplitude value for each TOF scan number. Then, based on the measurement values, an optimum gain amount is calculated for each TOF scan number. The gain amount data calculated through the pre-scan is stored in a gain amount memory inside the gain control circuit 57 in step 502.

Here, as a method of calculating an optimum gain amount from the maximum amplitude value, similar to the gain control described in the first embodiment, the gain amount can be determined in accordance with a threshold value provided with respect to the full scale of the A/D converter 51. Alternatively, the optimum gain amount data can be computed in the CPU 6 after the data indicating the maximum amplitude value characteristic is once transferred to the CPU 6. Also, the number of times of a pre-scan is not limited to once, but can be performed plural times to obtain an average value of the plural gain amount data. Then, that average value may be stored in the gain amount memory.

In step 503, the optimum gain amount is read from the gain amount memory in accordance with the TOF scan number provided to a TOF scan to be performed in step 504, and is then automatically set in the gain adjusting circuit 55 and the signal adding operation circuit 54. In steps 504 and 505, the TOF scan is performed with using the gain setting determined by the pre-scan, and the measurement data is stored in the addition memory 53. After the TOF scan is completed, a measurement end determination is performed based on the number of times of scan in step 506. If conditions have not yet been satisfied, the procedure returns to step 503 to repeat the next gain setting and the TOF scan process in process 507. If conditions have been satisfied, the measurement procedure ends.

As described above, in the second embodiment, a pre-scan is performed before mass spectrum measurement to measure a maximum amplitude value characteristic in advance, and then optimum gain amount data in accordance with that characteristic is calculated and recorded. By doing so, as shown in FIG. 4, even in the case of an ion signal whose maximum amplitude value is abruptly changed, automatic adjustment to an optimum gain can be achieved in accordance with the recorded gain amount data. Therefore, a measurement can be performed in a dynamic range as high as possible without causing an overrange in any TOF scan.

Also, since the maximum amplitude value characteristic of the ion signal may be varied depending on the sample or measurement conditions, the characteristic at the time of mass spectrum measurement does not necessarily match with the characteristic measured in the pre-scan. In particular, in a portion where the amplitude value is abruptly increased, a change amount thereof is too large, and therefore the maximum amplitude value for each TOF scan cannot be reproduced in some cases. Thus, there is the possibility that an overrange occurs even though the gain amount data calculated and recorded in the pre-scan is set for the measurement.

In such a case, in the data acquisition circuit in the second embodiment, for the characteristic with a sudden rising where the maximum amplitude value reaches its peak in a third TOF scan, for example, in the TOF scans until the third scans (until the maximum amplitude value reaches its peak), the gain amount recorded for each TOF scan number is not used, but a gain amount obtained in accordance with the peak value of the maximum amplitude value characteristic is used instead. By doing so, it is possible to prevent an overrange from occurring in the rising portion.

Third Embodiment

Next, a mass spectrometer and a data processing method thereof according to a third embodiment of the present invention will be described.

A data acquisition circuit according to the third embodiment has a feature in a gain adjusting method. The hardware configuration and measurement data adding method are similar to those of the first embodiment described above.

As described above, in the maximum amplitude value characteristic of the ion signal, as for a trailing portion where the amplitude value is gradually attenuated from its peak point, approximately the same characteristic can be obtained even though the sample or measurement conditions are changed. Depending on the difference in characteristic at a rising portion, however, the characteristic in that trailing portion is also slightly changed.

For its prevention, in the second embodiment, optimum gain amounts in accordance with the characteristic of the maximum amplitude value of the ion signal are recorded in advance through a pre-scan, so that a measurement can be achieved in a dynamic range as high as possible without causing an overrange in any TOF scan. However, in the case where the maximum amplitude value characteristic (in particular, a characteristic on the trailing side) of the ion signal at the time of mass spectrum measurement is different from that in the pre-scan for the reasons described above, for example, proper gain adjustment cannot be performed with using the gain amount data recorded in advance, which may instead cause an overrange or decrease the dynamic range for measurement.

Therefore, in the third embodiment, the first and second embodiments are combined together, in which TOF scans are performed while switching the gain adjustment method between the rising portion until the maximum amplitude value characteristic of the ion signal reaches its peak and the trailing portion after the peak. By doing so, even if the maximum amplitude value characteristic (in particular, the characteristic on the trailing side) of the ion signal at the time of mass spectrum measurement is different from that in the pre-scan, a measurement can be performed in a dynamic range as high as possible without causing an overrange in any TOF scan.

Figure 6:
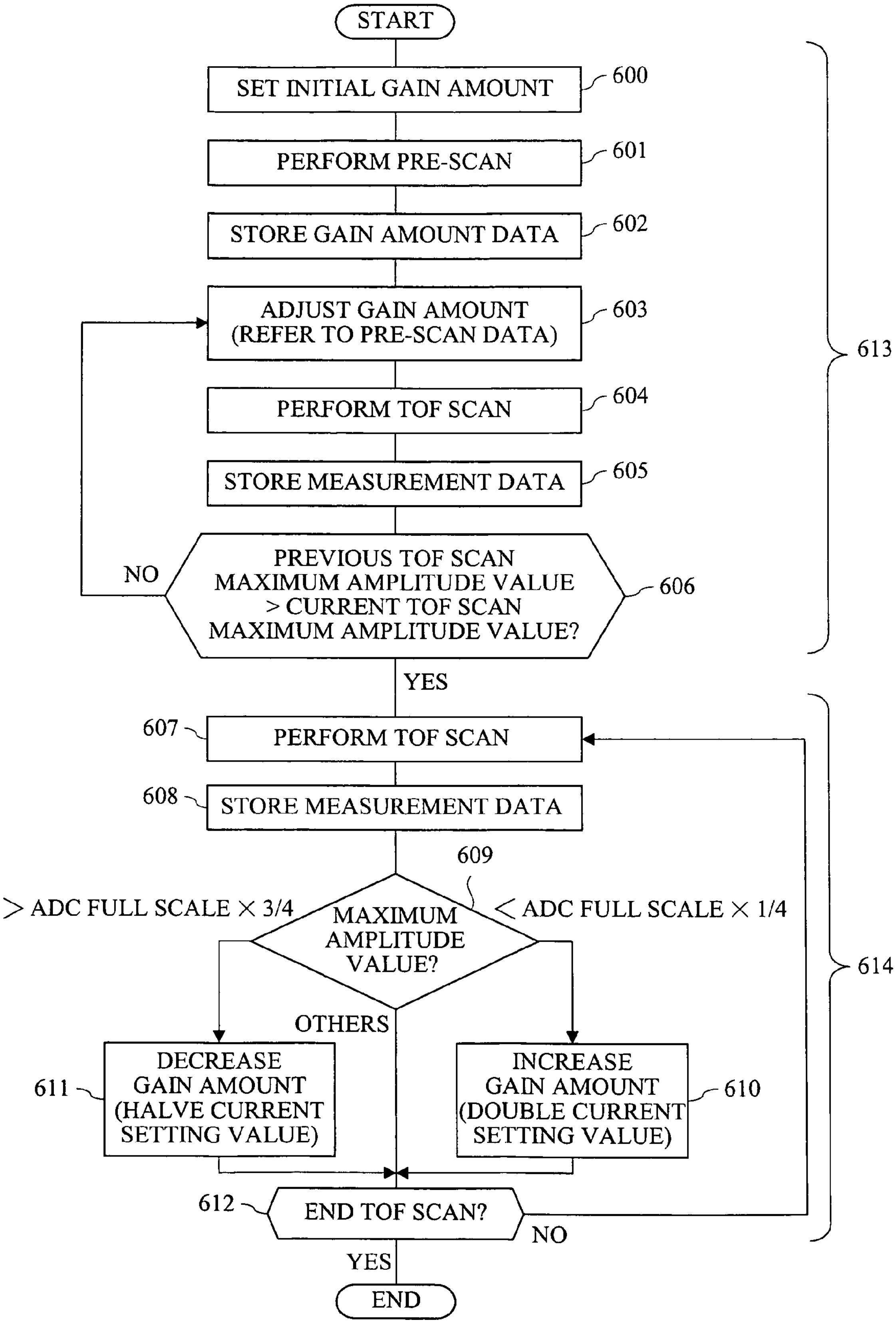
FIG. 6 is a flow diagram of a process at the time of mass spectrum measurement according to a third embodiment of the present invention.

An example of a mass spectrum process according to the third embodiment will be described with reference to FIG. 6. FIG. 6 depicts a process flow at the time of mass spectrum measurement.

In the third embodiment, the procedure includes steps 600 to 605 (process 613), step 606, and steps 607 to 612 (process 614). The gain adjustment method for TOF scan is switched in step 606.

First, the TOF scan until the maximum amplitude value characteristic of the ion signal reaches its peak (process 613) is performed with using the gain adjustment by the pre-scan described in the second embodiment. Since details of the process 613 (steps 600 to 605) are similar to those in the flowchart described with reference to FIG. 5 in the second embodiment, the description thereof is omitted here.

In step 606, a direction of changing the obtained maximum amplitude value is determined. If the maximum amplitude value obtained in the TOF scan this time is larger than the maximum amplitude value obtained in the previous TOF scan, the maximum amplitude value obtained in the current TOF scan is determined as a value on the rising side of the characteristic, and steps 603 to 606 are repeated.

Conversely, if the value obtained in the TOF scan this time is smaller, the value is determined as a value on the trailing side of the characteristic, and the procedure then goes to step 607.

In TOF scan process 614 on the trailing side of the amplitude value characteristic, similar to the first embodiment, a TOF scan with using the gain adjustment based on the immediately preceding TOF scan data is performed. Since details of process 614 (steps 607 to 612) are similar to those in the flowchart described with reference to FIG. 3 in the first embodiment, the description thereof is omitted here.

In FIG. 6, the determination in step 606 is made based on whether the maximum amplitude value obtained this time is smaller than that of the immediately preceding TOF scan. Alternatively, the process 614 can be started when changes in maximum amplitude value become mild to some degree.

As described above, in the third embodiment, the first and second embodiments are combined together, in which the TOF scan gain adjustment method is switched before and after the peak value of the maximum amplitude value characteristic of the ion signal. In the rising portion until the maximum amplitude value characteristic of the ion signal reaches its peak, similar to the second embodiment, a TOF scan is performed in accordance with the gain amount recorded in advance. In the trailing portion after the peak, similar to the first embodiment, a TOF scan is performed while calculating an optimum gain amount for the next TOF scan based on the immediately preceding TOF scan data. Consequently, even if a maximum amplitude value characteristic of the ion signal until reaching its peak is steep and a characteristic in the trailing portion of the maximum amplitude value characteristic at the time of mass spectrum measurement is different from that in the pre-scan, a measurement can be performed in a dynamic range as high as possible without causing an overrange in any TOF scan.

Fourth Embodiment

Next, a data processing device for mass spectrometry and a data processing method thereof according to a fourth embodiment of the present invention will be described.

Note that description of the function of components identical to those in the first embodiment is omitted as much as possible.

Figure 7:
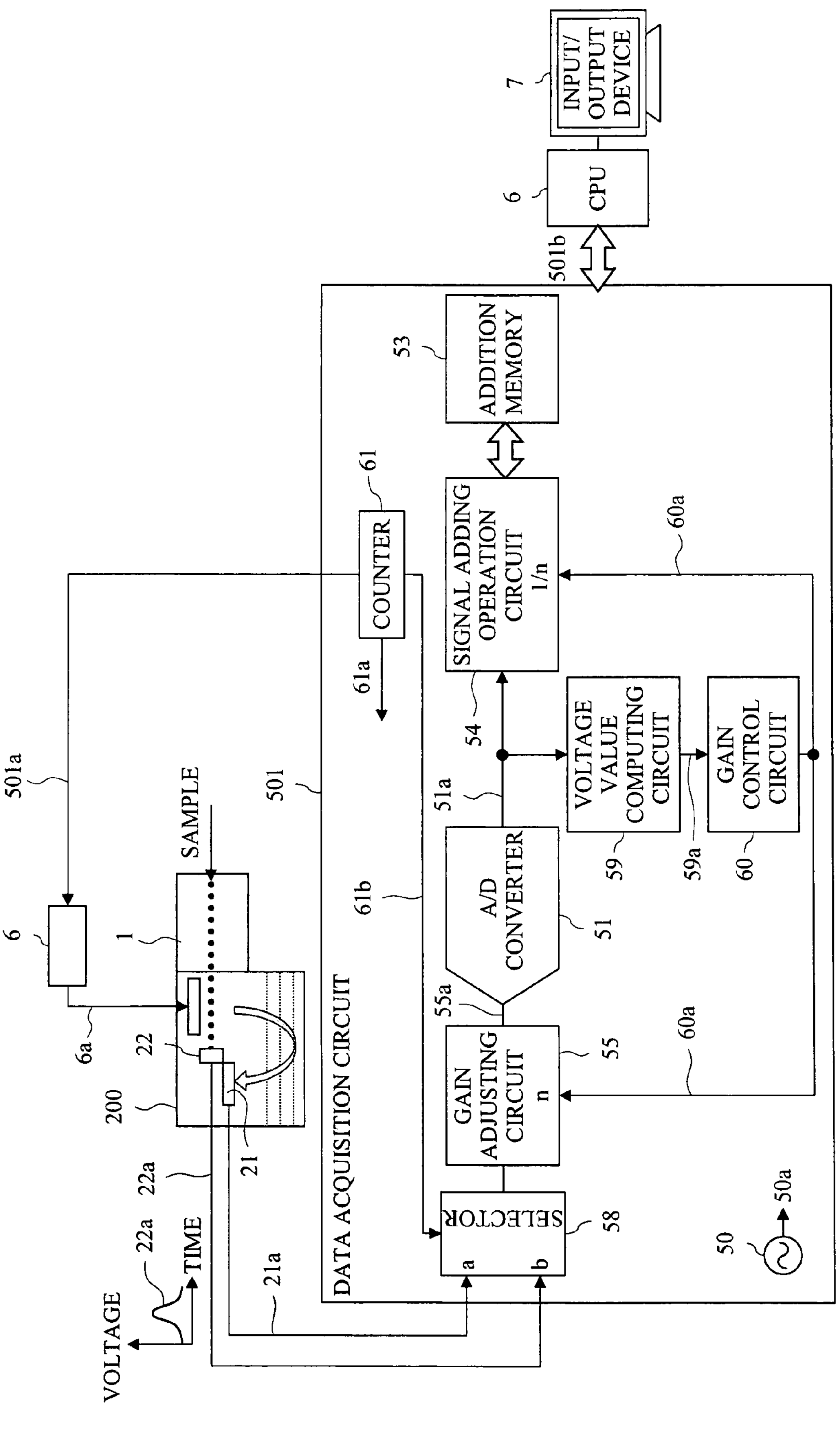
FIG. 7 is a drawing of the configuration of a mass spectrometer using a data processing device of an A/D conversion type for mass spectrometry according to a fourth embodiment of the present invention.

An example of the configuration of a mass spectrometer using a data processing device of an A/D conversion type for mass spectrometry according to the fourth embodiment of the present invention will be described with reference to FIG. 7. FIG. 7 depicts the configuration of a mass spectrometer using the data processing device of an A/D conversion type for mass spectrometry.

In the mass spectrometer according to the fourth embodiment, a detector 21 for detecting ions and an ion flow rate detector 22 for detecting an ion flow rate flowing into the TOF region 200 before being injected by TOF scans are added to the configuration of the first embodiment.

Also, a data acquisition circuit 501 in the fourth embodiment includes, in addition to the components in the first embodiment, a selector 58 for selecting a data input signal and a voltage value computing circuit 59 for obtaining an addition value of the voltage values based on the TOF scan data 51*a* digitized by the A/D converter 51. The amount of ions in the TOF region 200 is detected in advance before the TOF scans, and the gain of the ion detection signal 21*a* is adjusted based on the amount of ions. Thus, for the ion detection signal having a signal level varied for each TOF scan as described above, a dynamic range corresponding to the amount of ions can be set without performing the pre-scan in any TOF scan.

Figure 8:
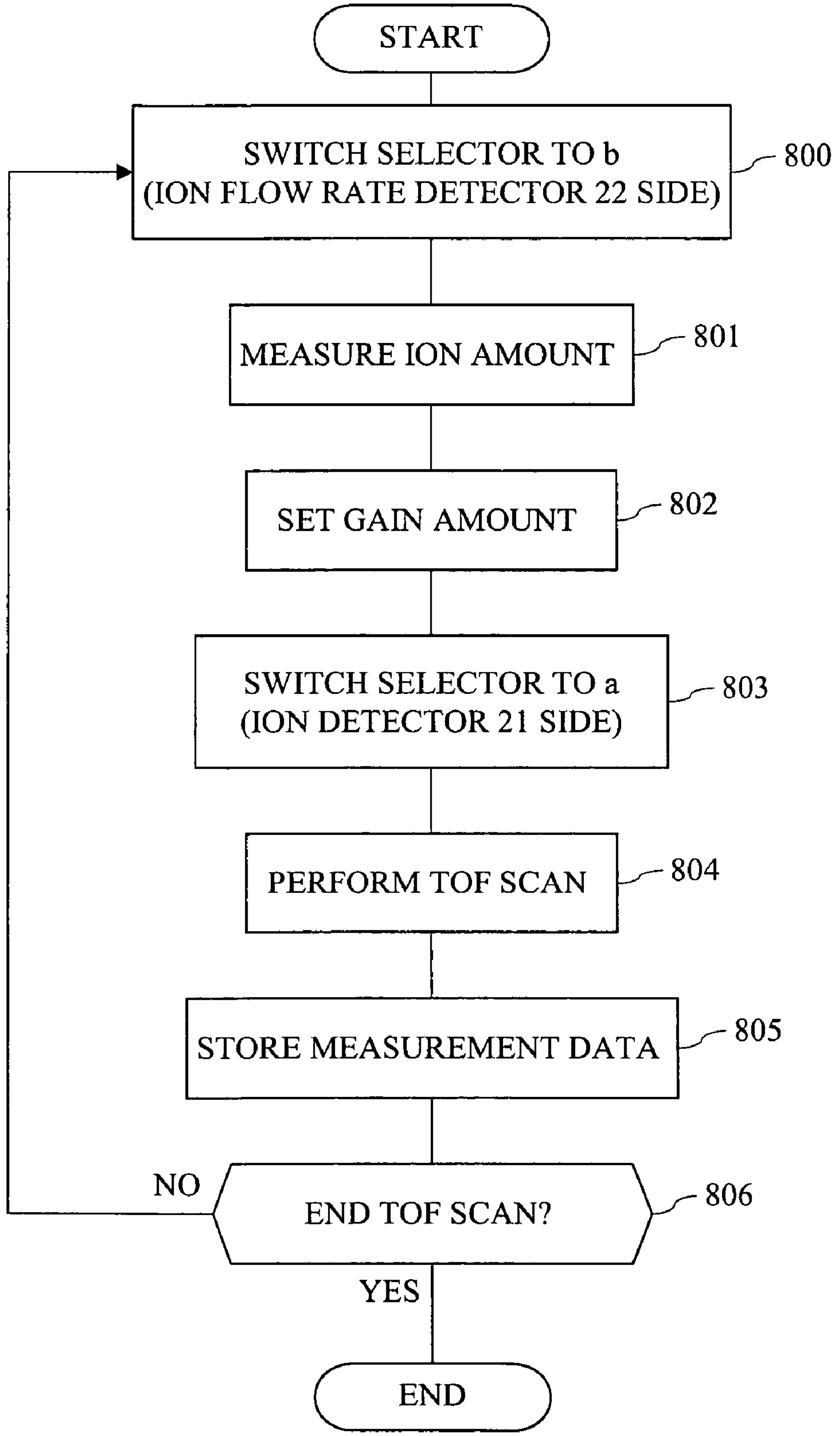
FIG. 8 is a flow diagram of a process at the time of mass spectrum measurement according to the fourth embodiment of the present invention.
Figure 9:
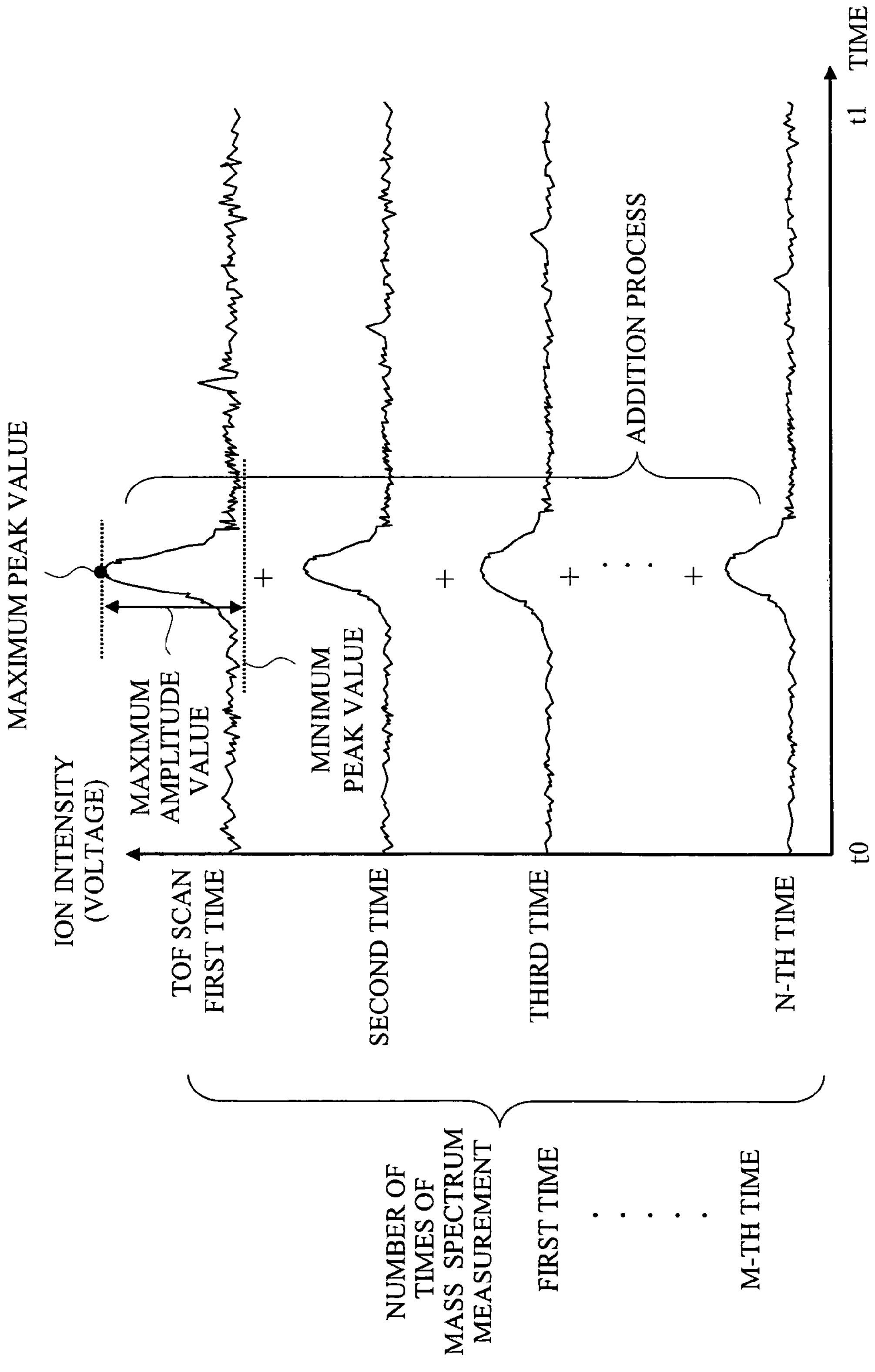
FIG. 9 is a drawing that depicts a state of measurement (TOF scan) and an addition process in a conventional mass spectrometer studied as a premise of the present invention.
Figure 10:
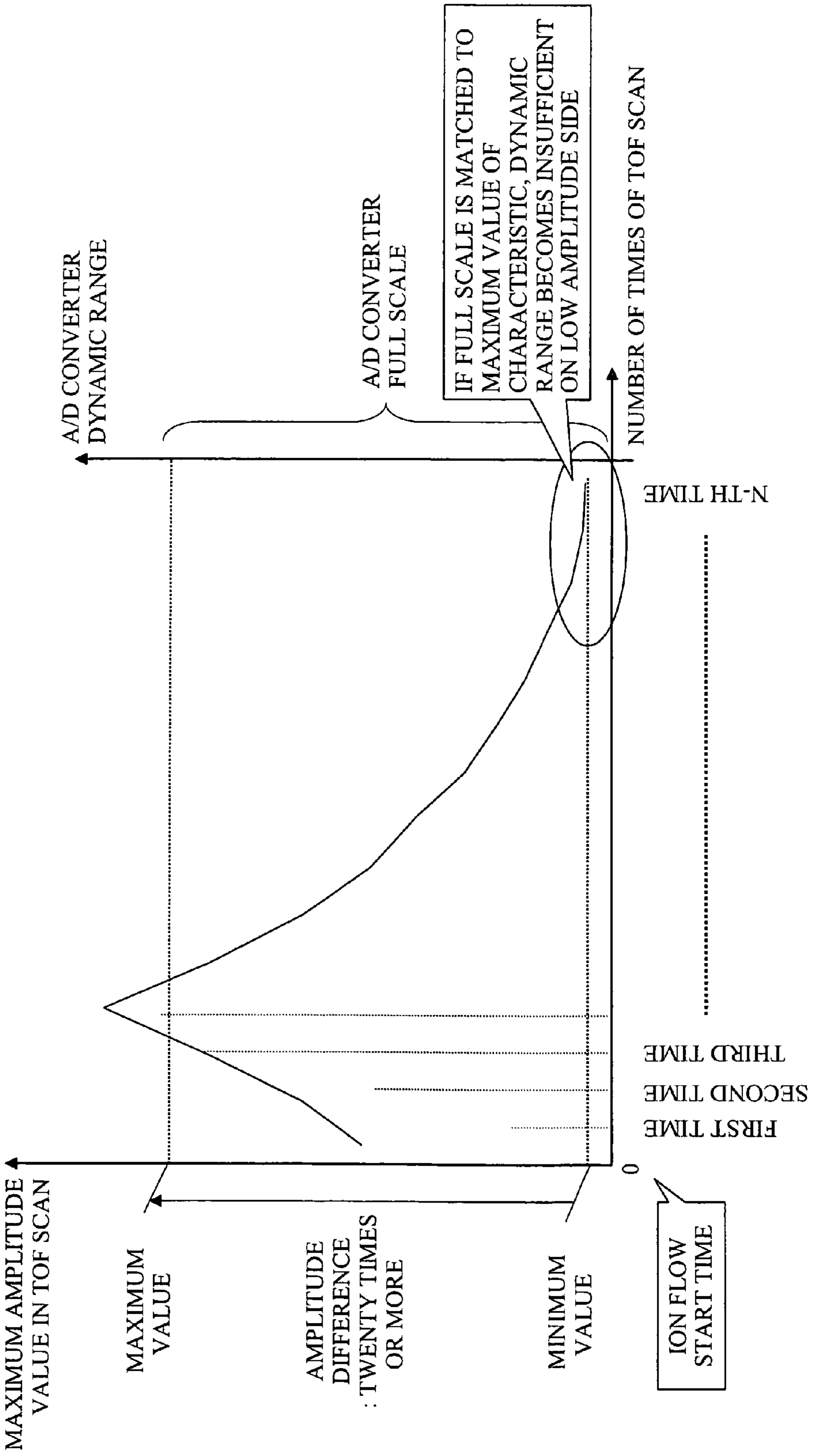
FIG. 10 is a drawing of a maximum amplitude value characteristic for each TOF scan in the conventional mass spectrometer studied as the premise of the present invention.

An example of a mass spectrum process in the fourth embodiment will be described with reference to FIG. 8. FIG. 8 depicts a process flow at the time of mass spectrum measurement.

When the mass spectrum measurement is started, the data acquisition circuit 501 switches the selector 58 to a terminal b side, thereby starting a measurement of a signal 22*a* from the ion flow rate detector 22.

This selector 58 is controlled by a switching signal 61*b* from a counter 61 (step 800).

In step 801, the flow rate of ions flowing into the TOF region 200 is measured. The ion flow rate detector 22 detects the amount of ions flowing into the TOF region 200 before TOF scans, and the detection signal 22*a* thereof is then sampled by the A/D converter 51 of the data acquisition circuit 501. Next, the voltage value computing circuit 59 adds up all the voltage value data for respective sampling times outputted from the A/D converter 51. This ion amount measurement time before TOF scans is assumed to be arbitrary, and can be freely set by the user.

Next, a gain control circuit 60 determines a gain amount optimum for measuring an ion signal at the time of a TOF scan based on an added voltage value 59*a* calculated in the voltage value computing circuit 59, and the gain amount is then set to the gain adjusting circuit 55 and the signal adding operation circuit 54. As a method of calculating the gain amount data 60*a*, the gain amount data 60*a* can be determined from the amount of ions in accordance with a conversion table prepared in advance. Alternatively, the gain amount data 60*a* can be obtained through the computing process using a certain conversion formula for each ion amount measurement (step

801). When the gain amount is determined through steps 801 and 802, the data acquisition circuit 501 switches the selector 58 to a terminal a side, thereby performing the TOF scan in the same manner as the conventional technology (step 804).

As described above, according to the fourth embodiment, unlike the first to third embodiments where a value extracted from the ion detection signal is used for gain adjustment, another detector is provided in the TOF region 200 for detecting the amount of ions inside the TOF region 200 in advance before TOF scans, and the gain of the ion detection signal 21*a* is adjusted based on that amount of ions. By doing so, for the above-described ion detection signal having an ion concentration (signal level) varied for each TOF scan, a dynamic range corresponding to the amount of ions can be set without performing the pre-scan in any TOF scan. Consequently, it is possible to provide the data processing device for mass spectrometry capable of improving the sensitivity of the mass spectrometer.

The amplitude value computing circuit 56, the voltage value computing circuit 59, and the gain control circuits 57 and 60 described in the first to fourth embodiments can be easily implemented by using an FPGA (Field Programmable Gate Array) generally used in signal processing of recent measurement boards and others, an MPU incorporated therein, and the like. Therefore, it is needless to say that there are various implementation means.

Fifth Embodiment

Next, a mass spectrometer and a data processing method thereof according to a fifth embodiment of the present invention will be described.

In the fifth embodiment, a method of processing the TOF scan data in which an overrange occurs described in the first embodiment will be described in further detail. The present embodiment will be described based on the first embodiment, and description of the function of components identical to those of the first embodiment is omitted as much as possible.

Figure 11:
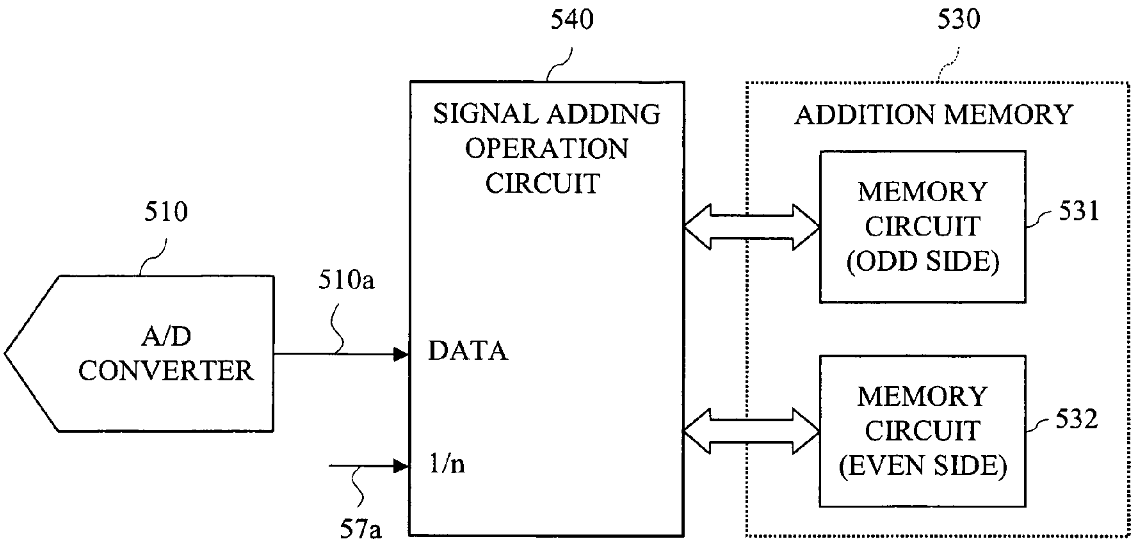
FIG. 11 is a drawing of the configuration of an addition memory according to a fifth embodiment of the present invention.

An example of the configuration of an addition memory in the fifth embodiment of the present invention will be described with reference to FIG. 11. In FIG. 11, in addition to the configuration of an addition memory 530, an A/D converter 510 and a signal adding operation circuit 540 are also shown. The addition memory 530 includes an ODD-side memory circuit 531 and an EVEN-side memory circuit 532. Note that the number of memory circuits included in the addition memory 530 may be three or more. An output signal (510*a*) of the A/D converter 510 contains data indicating that an overrange has occurred at the time of signal input of the A/D converter 510 in addition to the data digitized by the A/D converter 510.

In the operation in the case of an odd-numbered TOF scan (first process), the data 510*a* sampled by the A/D converter 510 and data added in the ODD-side memory circuit 531 so far are read and are subjected to an addition process, and then, are stored in the EVEN-side memory circuit 532. Similarly, in the operation in the case of an even-numbered TOF scan (second process), the data 510*a* sampled by the A/D converter 510 and data added in the EVEN-side memory circuit 532 so far are read and are subjected to an addition process, and then, are stored in the ODD-side memory circuit 531. Accordingly, the addition process results for obtaining a mass spectrum are obtained by reading the data from the memory circuit in which final addition results after the end of measurement are stored.

Next, a process of eliminating all the data of a TOF scan where an overrange has occurred will be described. For example, the case where an overrange has occurred in an odd-numbered TOF scan, which is in an operation state of the first process, will be described as an example. That is, the TOF scan where an overrange has occurred is terminated as normally. Also in the next TOF scan, however, an addition process is performed again by using the method for the addition memory 530 for the first process. Consequently, by performing the data storage from an operation state of the first process again, the EVEN-side memory circuit 532 in which the addition results before the overrange has occurred are stored is read, and newly-sampled data is subjected to an addition process. As a result, it is possible to easily eliminate the TOF scan data where the overrange has occurred.

Next, a method of controlling gain amount adjustment data in the present embodiment will be described. When no overrange has occurred, the method identical to that in the first embodiment is used. When an overrange occurs, however, the maximum amplitude value cannot be computed with high accuracy. Therefore, the gain amount adjustment data is unconditionally changed in a direction where no overrange occurs.

In the description of the present embodiment, the first embodiment is taken as an example. Also in the second and third embodiments, all the data of the TOF scan where the overrange has occurred can be easily eliminated by the use of the addition memory shown in FIG. 11.

As described above, according to the present embodiment, even if an overrange occurs, degradation in signal addition results due to the overrange can be easily prevented.

Sixth Embodiment

Next, a mass spectrometer and a data processing method thereof according to a sixth embodiment of the present invention will be described.

In the description of the above-described embodiments, the gain amount is adjusted based on the immediately preceding mass spectrum measurement or the maximum amplitude value during the TOF scan. In the present embodiment, described is a gain value setting method at the time of measurement start in the case where no previous maximum amplitude value is present such as before the start of a mass spectrum measurement and the case where a device user changes the concentration of the sample. In the present embodiment, a correlation between the concentration of the sample and the maximum amplitude value of the ion signal is obtained in advance, and a gain amount for measurement is determined from its relational expression.

Therefore, according to the present embodiment, the measurement with an appropriate gain amount can be performed from the start of the measurement. The gain amount adjustment in the present embodiment can be applied to any of the first, second, and third embodiments.

Seventh Embodiment

Next, a mass spectrometer and a data processing method thereof according to a seventh embodiment of the present invention will be described.

In the seventh embodiment, description is made based on the method of processing TOF scan data described in the first embodiment, and description of the function of components identical to those of the first embodiment is omitted as much as possible.

In the present embodiment, the case where the speed of sampling the signal in the A/D converter 51 is based on a clock cycle (t second) generated from the clock generator 50 and data is sampled at a clock cycle equal to or shorter than this clock cycle in data addition process will be described below.

Figure 12:
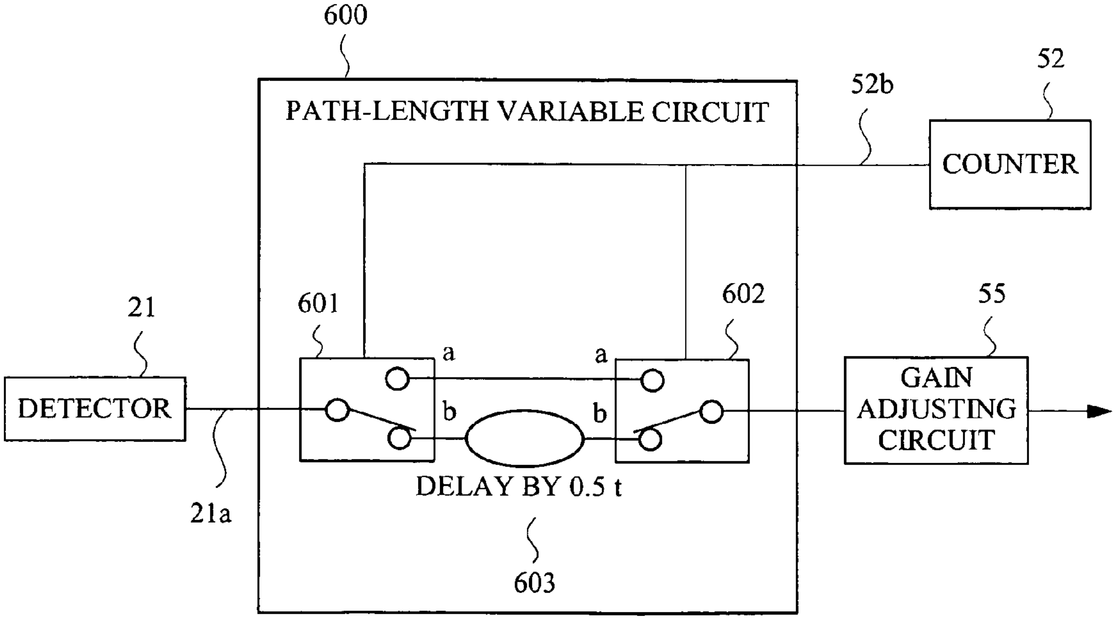
FIG. 12 is a drawing of the configuration from a detector to a gain adjusting circuit according to a seventh embodiment of the present invention.

An example of the configuration from the detector to the gain adjusting circuit in the seventh embodiment of the present invention will be described with reference to FIG. 12. In FIG. 12, a path-length variable circuit 600 is provided between the detector 21 for detecting ions and the gain adjusting circuit 55. The path-length variable circuit 600 includes selectors 601 and 602 for switching two paths and a delay unit 603 with a delay of 0.5 t, which is ½ of a clock generation cycle of the clock generator 50, wherein a path a-a and a path b-b in which a delay amount of 0.5 t is produced via the delay unit 603 are formed. A signal for selecting the path a-a or b-b is generated from the counter 52, and a path of the ion detection signal 21*a* is determined in accordance with that signal in the selectors 601 and 602.

A sampling interval of the signal addition to the addition memory 53 is the clock cycle t in the first embodiment. Meanwhile, the clock cycle in the present embodiment is 0.5 t. In this case, the number of times of TOF scan is controlled in the counter 52, wherein the path a-a is selected at the time of odd-numbered TOF scans and the path b-b is selected at the time of even-numbered TOF scans to perform an addition process of the ion detection signal 21*a*. In the signal addition at that time, in an odd-numbered TOF scan, the path a-a is selected on the basis of the measurement start signal 500*a* to perform sampling of the ion detection signal without a delay of 0.5 t. In an even-numbered TOF scan, the path b-b is selected on the basis of the measurement start signal 500*a* to perform sampling of the ion detection signal with a delay of 0.5 t. Then, the sampling results are stored. Therefore, after the end of TOF scans, the results obtained by sampling the ion detection signal at intervals of 0.5 t are stored.

As described above, according to the present embodiment, a sampling cycle of 0.5 t can be achieved by using the data acquisition circuit with the sampling interval of t. Although ½ of the sampling cycle t has been taken as an example in the description of the present embodiment, it is easily understood that sampling intervals shorter than the sampling interval t can be easily achieved by increasing the number of paths in the path-length variable circuit 600.

Eighth Embodiment

Next, a mass spectrometer and a data processing method thereof according to an eighth embodiment of the present invention will be described.

The gain amount adjusting process and the data eliminating process at the time of occurrence of an overrange described in the first to fifth embodiments can be performed based on a determination algorithm in the device. Alternatively, the determination whether to perform such processes can be made by the device user. For example, a measurement mode can be selectively changed from a control PC of the device.

In the foregoing, the invention made by the inventors of the present invention has been concretely described based on the embodiments. However, it is needless to say that the present invention is not limited to the foregoing embodiments and various modifications and alterations can be made within the scope of the present invention.

The present invention relates to a mass spectrometry technology. More particularly, it is effectively applied to a time-of-flight mass spectrometer provided with a data processing device for mass spectrometry using an A/D converter.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A time-of-flight mass spectrometer, comprising:

an interface which ionizes a sample;

a TOF region which injects ions from said interface and has a first detector for detecting said ions; and a data processing unit which receives and processes a detection signal from the TOF region, wherein said data processing unit includes:

gain adjusting means which adjusts a gain of an ion detection signal;

A/D conversion means which samples the signal whose gain is adjusted by the gain adjusting means and performs an A/D conversion;

maximum potential difference calculating means which obtains a maximum amplitude value of the signal which is A/D-converted by the A/D conversion means; and additional processing means which controls a gain adjustment amount based on the maximum amplitude value obtained in the maximum potential difference calculating means and also performs an addition process by weighting said A/D-converted signal.

2. The time-of-fight mass spectrometer according to claim 1, wherein, when an overrange occurs in the signal which is A/D-converted by said A/D conversion means, the additional processing means eliminates all the data sampled through relevant ion injections from addition results.

3. A time-of flight mass spectrometer, comprising:

an interface which ionizes a sample;

a TOF region which injects ions from said interface and has a first detector for detecting said ions; and a data processing unit which receives and processes a detection signal from the TOF region, wherein said data processing unit includes:

a gain adjusting circuit which adjusts a gain of an ion detection signal of the first detector in said TOF region;

an A/D converter which samples the ion detection signal from said gain adjusting circuit;

an additional memory which performs an addition process of sampling data from said A/D converter and stores the data;

an amplitude value computing circuit which calculates a maximum amplitude value of said ion detection signal; and a first gain control circuit which determines a weight of the sampling data for said gain adjusting circuit and said additional memory based on an output signal of said amplitude value computing circuit.

4. The time-of-fight mass spectrometer according to claim 3, wherein, when an overrange occurs in the data sampled by said A/D converter after an ion injection in said TOF region, all the data sampled through the relevant ion injections are eliminated from addition results in said addition memory.

5. The time-of-fight mass spectrometer according to claim 3, wherein addition results for each ion injection until an overrange occurs in the data sampled by said A/D converter is stored in said additional memory, means which temporarily retains sampling data until it can be determined whether the overrange occurs is provided, and when said overrange occurs, all the sampling data obtained though a relevant ion injection are eliminated from the addition results.

6. The time-of-fight mass spectrometer according to claim 3, wherein a gain adjustment value which is the weight of the sampling data for said gain adjusting circuit and said additional memory is determined from concentration of the sample and a type of the sample.

7. The time-of-fight mass spectrometer according to claim 3, wherein a path-length variable circuit which selects said ion detection signal from n paths with a time delay and outputs it to a circuit for sampling said ion detection signal is provided, and signal addition is performed at sampling intervals (t/n) shorter than sampling intervals (t) of said A/D converter.

8. The time-of-fight mass spectrometer according to claim 3, wherein said TOF region repeatedly injects ions from said interface, and said amplitude value computing circuit calculates the maximum amplitude value of the ion detection signal for each ion injection from said interface.

9. The time-of-fight mass spectrometer according to claim 3, wherein said TOF region repeatedly injects ions from said interface, and said first gain control circuit performs a predetermined operation to calculate a gain adjustment value for each ion injection based on the maximum amplitude value calculated by said amplitude value computing circuit, and determines the weight of the sampling data for said addition memory as a gain adjustment value for each of next and subsequent ion injections.

10. The time-of-fight mass spectrometer according to claim 3, wherein said data processing unit further includes:

said TOF region repeatedly injects ions from said interface;

an amplitude value computation storage circuit which stores the maximum amplitude value of the ion detection signal for each ion injection in a pre-scan;

a gain adjustment value calculation storage circuit which performs a predetermined operation to calculate a gain adjustment value for each ion injection based on the maximum amplitude value stored in said amplitude value computation storage circuit, and stores the calculated gain adjustment value as a gain adjustment value for each of next and subsequent ion injections; and a second gain control circuit which determines the weight of the sampling data for said addition memory based on an output from said gain adjustment value computation storage circuit, and wherein said amplitude value computation circuit and said first gain control circuit are selectively configured, and said amplitude value computation storage circuit, said gain adjustment value calculation storage circuit, and said second gain control circuit are selectively configured.

11. A time-of flight mass spectrometer, comprising:

an interface which ionizes a sample;

a TOF region which injects ions from said interface and has a first detector for detecting said ions; and a data processing unit which processes data detected in said TOF region, wherein said data processing unit includes:

a gain adjusting circuit which adjusts a gain of an ion detection signal detected in the first detector of said TOF region;

an A/D converter which samples the ion detection signal from said gain adjusting circuit;

an additional memory which performs an addition process of sampling data from said A/D converter and then stores the data;

a voltage value computation circuit which performs a predetermined computation with using voltage value data of said ion detection signal;

a second detector which detects ions before an ion injection in said TOF region; and a gain control circuit which measures an ion detection signal, which is an output of said second detector, before the ion injection and determines a weight of the sampling data for said gain adjusting circuit and said additional memory based on the results obtained from said voltage value computation circuit.

12. The time-of-fight mass spectrometer according to claim 11, wherein, when an overrange occurs in the data sampled by said A/D converter after the ion injection in said TOF region, all the data sampled through the relevant ion injections are eliminated from addition results.

13. The time-of-fight mass spectrometer according to claim 11, wherein a gain adjustment value, which is the weight of the sampling data for said gain adjusting circuit and said additional memory is determined from concentration of the sample and a type of the sample.

14. The time-of-fight mass spectrometer according to claim 11, wherein a path-length variable circuit which selects said ion detection signal from n paths with a time delay and outputs it to a circuit for sampling said ion detection signal is provided, and signal addition is performed at sampling intervals (t/n) shorter than sampling intervals (t) of said A/D converter.

15. A method for time-of-fight mass spectrometry, comprising the steps of:

ionizing a sample;

injecting the ionized ions and detecting the ions; and receiving and processing a detection signal of the ions, wherein the step of processing the ion detection signal further includes the steps of:

adjusting a gain of said ion detection signal;

sampling the gain-adjusted signal and performing A/D conversion;

obtaining a maximum amplitude value of the A/D-converted signal; and controlling an adjustment amount of said gain based on the obtained maximum amplitude value, and performing an additional process by weighting said A/D-converted signal.

16. The method for time-of-fight mass spectrometry according to claim 15, wherein, when an overrange occurs in said A/D-converted signal, all the data sampled through relevant ion injections are eliminated from addition results.

17. A method for time-of-fight mass spectrometry, comprising the steps of:

ionizing a sample;

injecting the ionized ions and detecting the ions; and receiving and processing a detection signal of the ions, wherein the step of processing the ion detection signal further includes the steps of:

sampling said ion detection signal and performing A/D conversion;

obtaining a maximum amplitude value of the A/D-converted signal;

adjusting a gain of a signal to be sampled and A/D-converted next time based on the obtained maximum amplitude value; and performing an additional process by weighting said A/D-converted signal based on said obtained maximum amplitude value and storing the result in a memory.

18. The method for time-of-fight mass spectrometry according to claim 17, wherein, when an overrange occurs in said A/D-converted signal, all the data sampled through relevant ion injections are eliminated from addition results.

19. The method for time-of-fight mass spectrometry according to claim 17, wherein, in an initial operation of sampling said ion detection signal and performing A/D conversion, the gain of said A/D converted signal is adjusted by using information about concentration of said sample or a type of said sample.

20. The method for time-of-fight mass spectrometry according to claim 17, wherein a path-length variable circuit which selects said ion detection signal from n paths with a time delay and outputs it to a circuit for sampling said ion detection signal is provided, and signal addition is performed at sampling intervals (t/n) shorter than sampling intervals (t) of said A/D converter.

21. The method for time-of-fight mass spectrometry according to claim 17, further comprising a step of:

detecting said ionized ions in a state before the ion injection, wherein, in the step of adjusting the gain of the signal to be sampled and A/D-converted next time, the gain of said signal to be A/D-converted is adjusted based on said obtained maximum amplitude value and said signal detected in the state before the ion injection, and in the step of performing an addition process by weighting said A/D-converted signal based on said obtained maximum amplitude value and storing the result in the memory, the addition process is performed by weighting said A/D-converted signal based on said obtained maximum amplitude value and said signal detected in the state before the ion injection and the result is stored in the memory.

* * * * *